Feb. 3, 1970            A. M. BASS            3,493,805

ULTRAVIOLET RESONANCE LAMP

Filed Nov. 1, 1967

INVENTOR.
ARNOLD M. BASS

BY
ATTORNEYS

United States Patent Office 3,493,805
Patented Feb. 3, 1970

3,493,805
ULTRAVIOLET RESONANCE LAMP
Arnold M. Bass, Silver Spring, Md., assignor to the United States of America as represented by the Administrator of the National Aeronautics and Space Administration
Filed Nov. 1, 1967, Ser. No. 679,885
Int. Cl. H01j 5/16, 61/40
U.S. Cl. 313—110          1 Claim

ABSTRACT OF THE DISCLOSURE

An ultraviolet resonance lamp comprising a tube containing a gas such as xenon, krypton, or the like, which gas is excited so as to produce atomic resonance lines of relatively high intensity.

Figure 1:
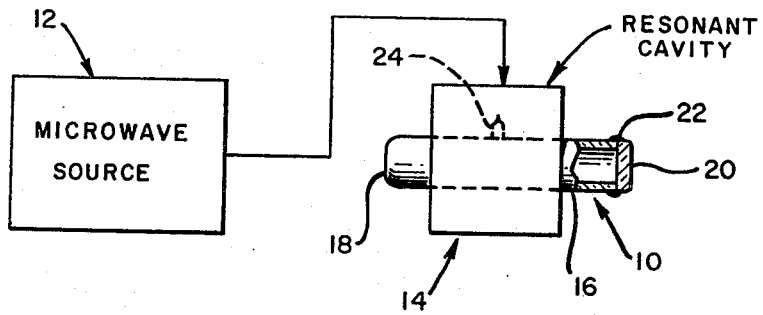

The tube contains an ultraviolet wave-permeable window through which radiation from the excited gas is transmitted. Decomposition and/or vaporization of the window seal, particularly with impingement of the gaseous discharge on the window, is prevented by means of a chamber which surrounds the tube adjacent the window. The window is in sealing engagement with the surrounding chamber and in non-sealing engagement with the tube. With this arrangement, even when the discharge is allowed to impinge upon the window, it is terminated a spaced distance from the window seal to substantially eliminate decomposition and/or vaporization of the window seal.

---

The invention described herein may be made by an employee of the United States Government and may be manufactured and used by or for the Government for Governmental purposes without the payment of any royalties thereon or therefor.

Resonance lamps for the production of monchromatic light of high intensity in the ultraviolet range are well known and include a tube of glass, or like fused silica material, which tube is filled with a suitable gas. The gas, when excited, produces resonance lines which are useful in photochemical work, such as photolysis, and the like. Gases such as xenon, kryton, argon, neon, helium, and the like, and mixtures of gases have been used. The tube is provided with an ultraviolet wave-permeable window through which the radiation is transmitted, a window of lithium fluoride (LiF) often being used, which window filters out radiation which is shorter than approximately 1040 A.

The windows of prior art arrangements are secured directly to the tube as by cement, sealing compound, or other suitable sealing means. Often, when such lamps are operated with the gaseous discharge impinging on the window, the action of the discharge thereat weakens the seal or causes the seal to decompose. Also, the reaction products of the decomposition and/or vaporization may coat the window, thereby adversely affecting the ultraviolet transmission therethrough. In addition, impurity atomic emission lines may be produced by the gases which result from the decomposition of the sealing composition.

An object of this invention is the provision of an ultraviolet resonance lamp which eliminates the above-mentioned problems encountered in the operation of prior art resonance lamps.

An object of this invention is the provision of an improved ultraviolet resonance lamp in which impingement of the gaseous discharge on the lamp window seal is prevented.

An object of this invention is to provision of an improved window mounting arrangement for resonance lamps which substantially eliminates decomposition and/ or vaporization of the window seal often produced when the discharge impinges on the window.

An object of this invention is the provision of an ultraviolet resonance lamp which may be operated with discharge at the window without rapid reduction in the ultraviolet transmission through the window due to vaporization and/or decomposition of the window sealing means.

The above and other objects and advantages of the invention are obtained by means of a resonance lamp comprising a body in the form of a tube which is open at one end. A skirt or sleeve-like member is formed on or attached to the outside of the tube a spaced distance from the open end. The skirt surrounds the tube and the open tube end terminates in substantially the plane of the open end of the skirt. A window is attached to the open end of the skirt in sealing engagement therewith, which window also closes the tube end in non-sealing manner. With this arrangement, even if the tube is operated with the discharge impinging on the window, the discharge terminates at the tube end at a spaced distance from the sealing means between the skirt and window. Consequently, vaporization and/or decomposition of the sealing means is substantially eliminated.

Figure 2:
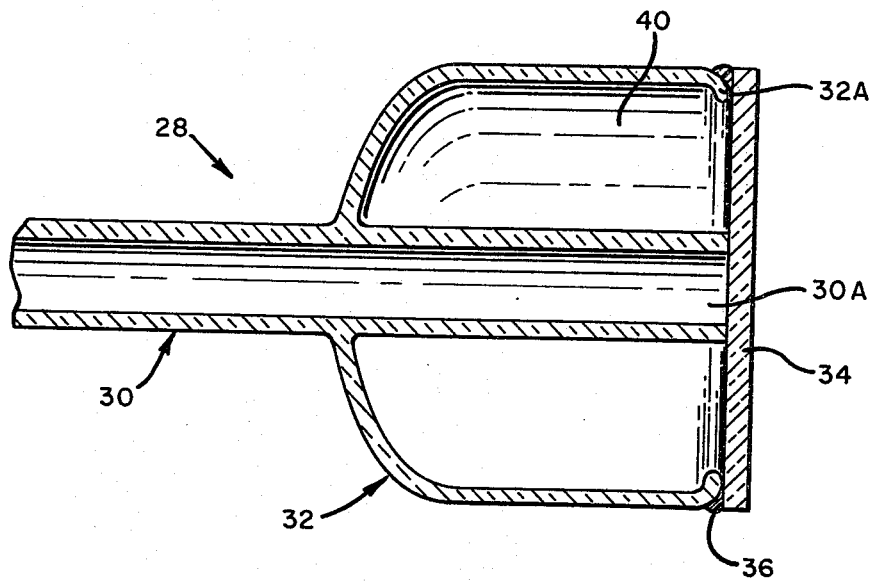

The invention will be better understood from the following description when taken in conjunction with the accompanying drawings. In the drawings:

FIGURE 1 is a generally diagrammatic view of a prior art resonance lamp excited by a microwave source; and FIGURE 2 is an enlarged fragmentary cross-sectional view of a resonance lamp embodying the novel window mounting arrangement of this invention.

There are basically two different types of discharge resonance lamps, i.e. lamps which are excited by an arc voltage applied to electrodes within the tube, and lamps without electrodes, which lamps are excited by microwaves. In FIGURE 1 of the drawings there is shown a prior art resonance lamp 10 which is microwave operated by waves from a microwave source 12. The source 12 may comprise a microwave generator operating for example at 2450 mc./sec. and supplying 125 watts of power. Microwaves from the generator 12 are fed to a resonant cavity 14 into or through which cavity the resonance lamp 10 extends for excitation of the gas therewith.

A conventional ultraviolet resonance lamp includes a body comprising a tube 16 made of fused silica or like material such as glass, "Pyrex" or the like, which tube is closed at one end 18. An opening is formed at the other end of the tube which is closed by an ultraviolet wave-permeable window 20 of lithium fluoride, or other suitable material. Seal means 22 such as "Apiezon W" wax, epoxy cement, or like material, is used to secure the window to the tube.

The tube 16 is first evacuated and then supplied with a suitable gas as through a line 24 which is subsequently sealed off as illustrated. A suitable getter, not shown, may be included in the lamp for the absorption of impurity gases, and the tube may be cooled if desired, to remove condensible impurities such as water vapor which may be present in the gas or desorbed from the tube walls during operation.

Both high and low pressure resonance lamp systems are known. With a low pressure system, gas at a pressure of approximately 1 mm. Hg is employed. With the tube exposed to microwaves from the source 12, discharge is initiated by a spark from a Tesla coil not shown. For maximum intensity output from the lamp, the power source 12 is adjusted so that the visible discharge within the tube contacts the window 20. However, as noted above, decomposition and/or vaporization of the sealing means 22 is particularly rapid when the discharge contacts the window, whereby the window seal is weakened and the window is coated with the reaction products.

A novel lamp construction which eliminates these problems is shown in FIGURE 2 to which figure reference is now made. There, a fragmentary portion of a lamp 28 is shown comprising a tube 30 of fused silica or like material such as "Pyrex," or the like. The tube 30, as with the tube 10, is closed at the one end not shown, and open at the end 30A. A jacket, or skirt member 32 surrounds the tube at the open end thereof and is attached thereto or formed thereon at a spaced distance from the open end 30A. The jacket is generally coaxially located with the tube 30, and may be provided with an inwardly directed lip or rim 32A at the one end thereof. The forward ends of the jacket and tube are substantially coplanar, and a window 34 of lithium fluoride, or the like serves to close the open ends of the tube and jacket. Fastening and sealing means 36 such as "Apiezon W" wax, epoxy cement, or the like, is used to secure the window to the jacket. The sealing means is shown applied to the annular groove formed between the window and jacket by the inturned lip 32A. No sealing means are provided between the window 34 and the tube end.

With this arrangement the tube end 30A abuts or is closely spaced from the window 34 at the central portion of the window. A chamber 40 is formed at the end of the tube 30 between the jacket 32, tube 30, and window 34, which chamber communicates with the interior of the tube 30 through the space between the unsealed end of the tube and the window. Thus, it will be understood that when the tube is evacuated and then supplied with gas, the chamber is simultaneously evacuated and filled.

It will be seen that the seal means 36 at the edge of the window is spaced from the tube end. Even when the lamp is operated with sufficient excitation for the discharge to impinge upon the central portion of the window, the discharge thereby is maintained at a sufficient distance from the seal 36 such that the seal is substantially unaffected thereby.

The invention having been described in detail in accordance with the requirements of the patent statutes, various changes and modifications may suggest themselves to those skilled in this art. For example, it will be apparent that the invention may be applied to lamps of the electrode type as well as to the illustrated electrodeless lamp. It is intended that the above and other such changes and modifications shall fall within the spirit and scope of the invention as defined in the appended claim.

I claim:
1. A gaseous discharge lamp including,
   a tube with first and second ends, said first end being sealed and said second end being substantially coplanar,
   a skirt surrounding said tube, said skirt having a first end and a second end, said first end of said skirt being secured to said tube near said second end of said tube, said second end of said skirt substantially occupying the plane described by said second end of said tube,
   a planar window,
   seal means to provide a sealing engagement between said window and said second end of said skirt, said window being in abutting relationship with said second end of said tube,
   said skirt, the portion of said tube coextensive therewith and the portion of said window between said skirt and said tube forming a chamber,
   a gas within said tube and said chamber,
   means for generating an electrical discharge inside of said tube, said chamber isolating said discharge from said seal means to reduce decomposition of said seal means.

References Cited
UNITED STATES PATENTS 2,763,806    9/1956    Anderson _____ 313—220 X
3,374,383    3/1968    Bergen et al. _____ 313—112 X JAMES W. LAWRENCE, Primary Examiner
RAYMOND F. HOSSFELD, Assistant Examiner U.S. Cl. X.R.
313—112, 161, 220